United States Patent
Berg et al.

(10) Patent No.: US 9,819,626 B1
(45) Date of Patent: Nov. 14, 2017

(54) PLACEMENT-DEPENDENT COMMUNICATION CHANNELS IN DISTRIBUTED SYSTEMS

(71) Applicant: Amazon Technologies, Inc., Reno, NV (US)

(72) Inventors: Paul William Berg, Seattle, WA (US); Alexander Julian Tribble, Seattle, WA (US); Robert Michael Barry, Woodland Hills, CA (US)

(73) Assignee: Amazon Technologies, Inc., Reno, NV (US)

( * ) Notice: Subject to any disclaimer, the term of this patent is extended or adjusted under 35 U.S.C. 154(b) by 138 days.

(21) Appl. No.: 14/229,338

(22) Filed: Mar. 28, 2014

(51) Int. Cl.
| | |
|---|---|
| *G06F 15/16* | (2006.01) |
| *H04L 12/58* | (2006.01) |
| *H04L 12/911* | (2013.01) |
| *H04L 29/08* | (2006.01) |

(52) U.S. Cl.
CPC .............. *H04L 51/18* (2013.01); *H04L 47/78* (2013.01); *H04L 67/1002* (2013.01)

(58) Field of Classification Search
CPC ....... H04L 51/18; H04L 47/78; H04L 47/783; H04L 67/1002; H04L 47/726; H04L 45/22
See application file for complete search history.

(56) References Cited

U.S. PATENT DOCUMENTS

| | | | | |
|---|---|---|---|---|
| 6,084,874 | A * | 7/2000 | Nguyen | H04L 47/781 370/352 |
| 6,145,028 | A * | 11/2000 | Shank | G06F 3/0607 710/31 |
| 8,276,139 | B2 | 9/2012 | Bozek et al. | |
| 8,336,050 | B2 | 12/2012 | Dake | |
| 8,386,855 | B2 | 2/2013 | Dake | |
| 8,387,060 | B2 | 2/2013 | Pirzada et al. | |
| 8,473,594 | B2 | 6/2013 | Astete et al. | |
| 8,505,029 | B1 | 8/2013 | Chanda et al. | |
| 9,054,964 | B2 * | 6/2015 | Rhoades | H04L 47/726 |
| 2002/0152446 | A1 * | 10/2002 | Fleming | G06F 11/0715 714/815 |
| 2008/0177896 | A1 * | 7/2008 | Quinn | G06F 9/5055 709/238 |
| 2010/0223397 | A1 * | 9/2010 | Elzur | H04L 45/586 709/235 |
| 2011/0296011 | A1 * | 12/2011 | Dare | G06F 9/544 709/224 |

(Continued)

OTHER PUBLICATIONS

InformIT, "Understanding How Xen Approaches Device Drivers", David Chisnall, Mar. 21, 2008, pp. 1-11.
"XenBus" Xen, retrieved Mar. 18, 2014, pp. 1-4.

*Primary Examiner* — Nam Tran
(74) *Attorney, Agent, or Firm* — Robert C. Kowert; Meyertons, Hood, Kivlin, Kowert & Goetzel, P.C.

(57) ABSTRACT

A first component of a network-accessible service is configured to participate in client-server interactions with other components of the service via a default communication channel. The first component has access to an alternate communication channel available only to a subset of components of the service. Using the alternate communication channel, the first component reaches a local workload agreement with a second component, in accordance with which at least some service requests of the first component or the second component are fulfilled using the alternate communication channel.

25 Claims, 11 Drawing Sheets

(56) References Cited

U.S. PATENT DOCUMENTS

2011/0296411 A1    12/2011   Tang et al.
2014/0068624 A1    3/2014   Fuller et al.
2014/0075243 A1    3/2014   Nagaraj

* cited by examiner

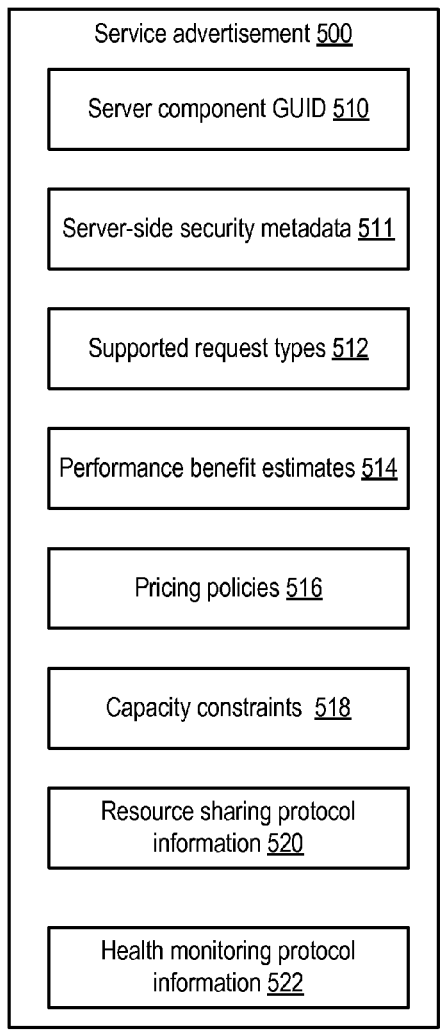
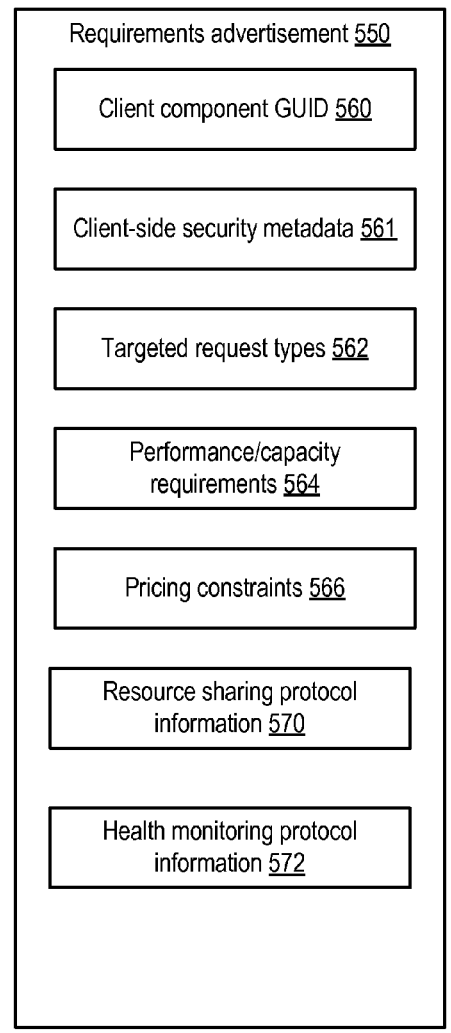
FIG. 5a
FIG. 5b

PLACEMENT-DEPENDENT COMMUNICATION CHANNELS IN DISTRIBUTED SYSTEMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Various types of distributed network-accessible services may be implemented using virtualization technologies by some providers. In many cases, as the workload for a given service increases, numerous server components may be instantiated using respective virtual machines at selected hosts within one or more large data centers. Such server components may be configured to respond to service requests received from numerous client components of the service, which may in some cases also be instantiated at virtual machines executed at various hosts at the data centers. In order to support scalability of the service, intermediary nodes such as load balancers may often be employed between the clients and the servers. In such environments, a given request from a client may first be transmitted over a network connection to a load balancer, and then forwarded from the load balancer to a selected server component of the service. A response to the request may follow the reverse pathway, again involving at least two network hops. The customer of the service may typically be allowed little or no control with respect to the selection of the specific hardware devices used for the server and client components. Depending on the component placement policies in use for various services, it may sometimes be the case that a client component and a server component with which the client component interacts are both instantiated at the same host, or at a nearby host located on the same rack or in the same data center room. Such nearby placements of interacting components may sometimes provide opportunities for more efficient inter-component communication than is possible using the more traditional request-response pathways involving intermediaries such as load balancers.

BRIEF DESCRIPTION OF DRAWINGS

FIGS. 5a and 5b illustrate example elements of a service component advertisement and a client request advertisement, respectively, that may be transmitted over a placement-dependent communication channel, according to at least some embodiments.

Figure 1:
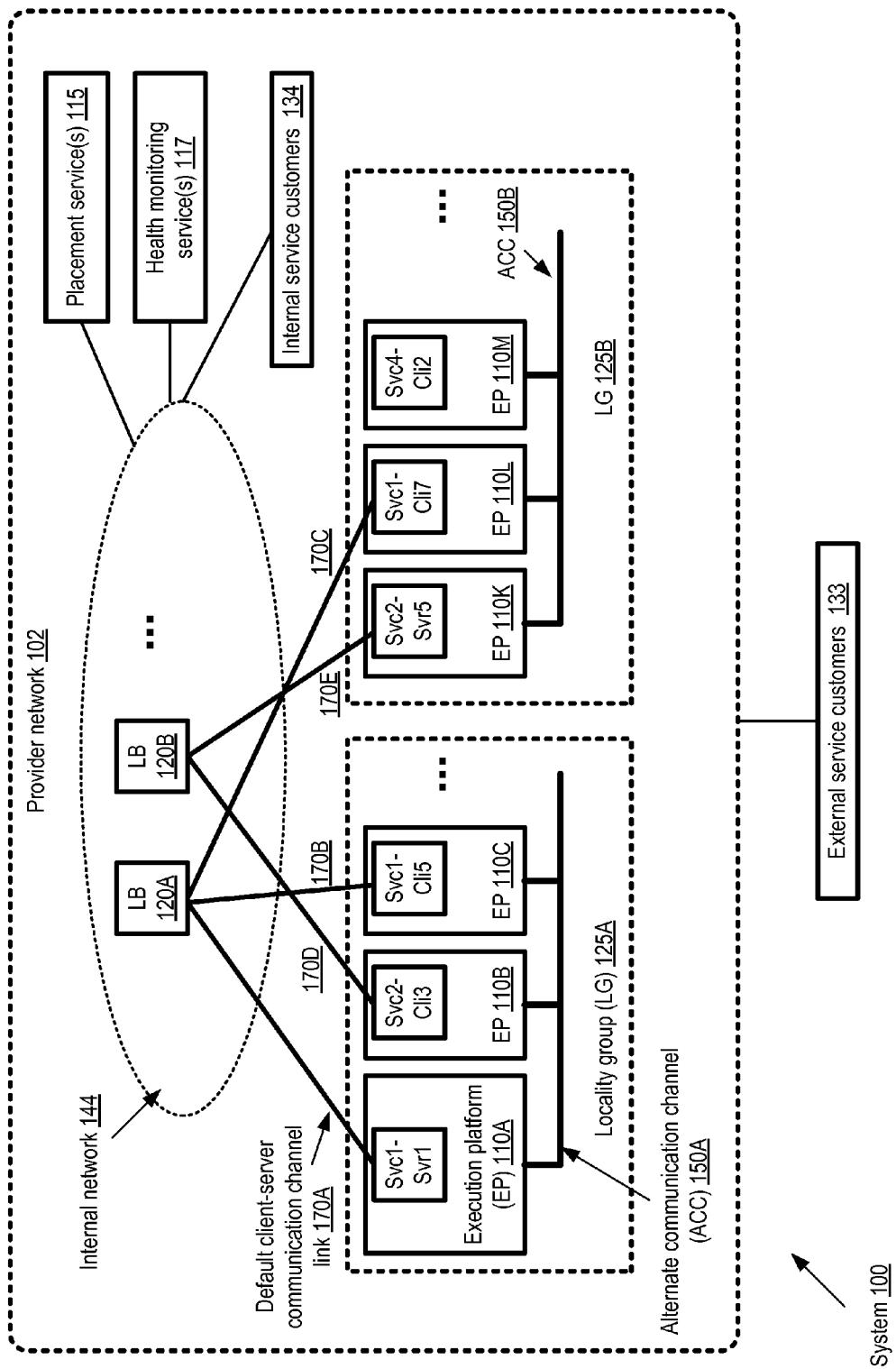
FIG. 1 illustrates an example system environment in which placement-dependent communication channels between service components may be used, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for utilizing placement-dependent communication channels in distributed systems such as provider networks are described. Networks set up by an entity such as a company or a public sector organization to provide one or more network-accessible services (such as various types of cloud-based database, computing or storage services) accessible via the Internet and/or other networks to a distributed set of clients may be termed provider networks herein. Some of the services may be used to build higher-level services: for example, computing, storage or database services may be used as building blocks for a content distribution service or a streaming data processing service. In some provider networks, some of the services may be exposed to external customers directly, while other services may be used internally within the provider network, e.g., to support various other services.

In many cases virtualization technologies may be used to implement components of various provider network services. For example, a single computing device may be used to instantiate multiple virtual machines of a computing service, which may be referred to as "compute instances" herein, with the computing device being referred to as an "instance host". The virtual machines may serve as execution platforms for a variety of applications and service components. Some number of compute instances on a given instance host may in some cases be used for server components of one set of services, while others may be used for client components of another (potentially overlapping) set of services. The client components may be set up, for example, as intermediaries between service consumers that submit work requests, and the server components at the back-end where at least some of the requested work is performed. The term "service component" may be used herein to refer generically to server components and client components of network-accessible services in a distributed system such as a provider network.

In general, for at least some services implemented at a provider network, a service consumer or customer may not have much control on exactly which set of instance hosts will be used for the service components that will collectively or individually respond to the consumer's service requests. In some embodiments, a placement manager may be responsible for selecting the execution platforms to be used for server and/or client components for a given service, based on factors such as the current availability of compute, storage or network capacity that can meet the anticipated workload at the time a component is configured, hardware utilization targets at the data centers of the provider network, network traffic conditions, and so on. In some provider networks, one or more internal services (referred to herein as "placement services") comprising one or more placement managers may be established specifically for making optimized placement choices for server and client components of various other services. In some embodiments, service customers may be able to indicate placement preferences for service components at a fairly coarse granularity—e.g., a customer may be able to choose a geographic region (which may include several large data centers potentially spread over several states or even countries) for a set of requested resources, but the decision as to which specific hosts are to be used at which specific data centers may be made by the placement managers. As a result, even though each placement decision may itself be made logically in accordance with one or more optimization policies by a placement manager, as the number of components instantiated for a given service grows, the client and server components of the service may sometimes appear to be distributed in an unpredictable or quasi-random way among various hosts of the distributed system.

To enable a service to scale, and to distribute the workload of the service relatively equitably across available resources, in at least some embodiments a load balancing technique may be used. In such an approach, the default communication channel used for service requests directed by client components towards server components may include a load balancer. The service requests and responses of such client-server interactions over the default communication channel may typically be transmitted in at least some embodiments at an application layer of the networking protocol being used, such as a protocol of the TCP/IP (Transmission Control Protocol/Internet Protocol) family. In at least some embodiments, for example, the client server interactions may employ some combination of HTTP (HyperText Transfer Protocol), WSDL (Web Services Description Language), and/or SOAP (Simple Object Access Protocol). For some services, a REST (representational state transfer) protocol may be used. A load balancer (which may itself be implemented using virtualized computing resources in at least some implementations, although hardware load balancers may also be used) may be configured to receive service requests from some set of client components, e.g., via respective TCP/IP network connections from the clients, and then distributed the service requests among some set of server components in accordance with a selected load balancing policy using other TCP/IP network connections to the servers. Thus, at least two (and sometimes more) network hops may be required for a service request to be delivered to a server component from a client component via the default communication channel in various embodiments. The response to the request may also require two or more network hops for at least some services in some embodiments. The request and response messages may need to be processed by the networking portion of the operating systems at each end of the communication, and in some cases by software components at the load balancer as well. The processing and the multiple network hops may contribute to the total latency typically required for a request-response interaction along the default channel.

According to some embodiments, depending on the placement of a given (client, server) component pair for a given service, an alternate communication channel that may be faster than the default channel for at least some types of interactions between the components may be available. For example, the placement manager may have ended up placing both the client and the server component at respective virtual machines on the same instance host, or at respective hosts mounted at the same server rack. At some instance hosts, a communication bus may be implemented by the virtualization management software stack, enabling fast messaging between low-level operating system components of the various virtual machines. In one implementation, for example, the communication bus may be used, among other purposes, for para-virtualized device drivers to communicate between respective operating system instances at the different virtual machines. Such a bus may allow a software module at a given virtual machine to transmit or broadcast messages that can be detected by bus listener modules at other virtual machines. The content of a message may be written by the sender to a shared page of physical memory, for example, that can be read by listeners that have registered for bus read/write operations with the virtualization management software stack. Only the subset of service components that are executed at the compute instances launched on a given instance host may be able to read and write to the communication bus. Thus, for those service components that happen to be instantiated at the same instance host by their respective placement managers, the bus may offer an alternate channel of communication to the default request-response pathway involving load balancers and network hops described above. The set of entities that have access to the bus (or some other alternate local channel of communication other than the default channel which typically comprises multiple network hops via a load balancer) may be referred to herein as a "locality group". The alternate channel may be referred to herein as a "placement-dependent" channel, as the availability of the channel to various service components may depend on their placement.

In general, a given service component (either a server or a client) that is instantiated at a host at which such an alternate communication channel is available may not be aware of the other service components that are also instantiated at the same host at any given time. Accordingly, a mechanism for matching clients with servers of the same service that both happen to have been instantiated at the same instance host, may be implemented in at least such embodiments. Such a technique may be referred to herein as a local service supply and demand discovery process, or more simply as a discovery process. According to at least one embodiment, as part of the discovery process, a server component may broadcast or transmit a component advertisement via the alternate channel, identifying itself and the types of service requests it is capable of responding to (or interested in responding to) via the alternate channel. The server's advertisement may be detected by other members of its locality group, e.g., by components that have registered as listeners on the alternate communication channel for at least some types of messages. If one of the other members happens to be a client component for the service indicated in the advertisement (i.e., a client component that is configured to submit the types of service requests that the server is capable of fulfilling), the client component may decide to submit at least some of its service requests via the alternate channel to the server component. In at least some embodiments, a set of negotiation messages may then be exchanged between the matched client and server component, leading to the establishment of a local workload agreement (similar in concept to a service level agreement) that defines the types and level of interactions that are mutually agreed upon between the two components. Such an agreement may, for example, indicate the maximum rate at which the server is willing to handle requests of a particular type from the client, performance objectives to be targeted for the responses, and so on. In some embodiments, some of the terms of the agreement may be conditioned on external factors—for example, if the overall load experienced by the service becomes very high, while the local load offered by the client remains relatively flat, the server component may have to take on more external workload via the default communication channels to other clients, and may thus have to reduce the capacity offered to the local client component. After the workload agreement is reached, the client component may transmit work requests to the server component via the alternate communication channel, and the server component may provide corresponding responses via the alternate channel.

In some embodiments, in addition to or instead of the advertisement broadcast by the server component, a client component may broadcast its own request advertisement to other members of the locality group using the alternate communication channel. The request advertisement may indicate, for example, the identity of the client, the kind of service requests the client would consider submitting via the alternate channel, and so on. Server components of the locality group (e.g., server components that have registered as listeners on the alternate channel) may detect the request advertisement and determine if they are capable of fulfilling the client's requests. If a given server component discovers a client with request types that match its capabilities, a negotiation process may be begun as described above, potentially resulting in a local workload agreement as described above. In various embodiments, the discovery process may be initiated by either server components, client components, or both types of service components.

A number of different types of alternate communication channels may be used in various embodiments, in addition to or instead of the communication bus described above that may be used for inter-virtual-machine communications on an instance host. For example, in some embodiments an alternate communication channel may be established between different hosts that are mounted on the same server rack at a data center. In some embodiments, the alternate communication channel may comprise one or more SCSI (Small Computer System Interface) controllers and/or cables, a HIPPI (high-performance parallel interface) bus or link, a fibre channel link, or various types of point-to-point interconnects between hosts. In one embodiment a rack-based alternate channel may include various network links between the hosts on the rack, configured collectively as a separate sub-network linked by a top-of-rack switch in one embodiment. In such embodiments, the server and client service components that happen to have access to the alternate channel may be considered members of a locality group. The service components sharing such a rack-level alternate communication channel may not necessarily be implemented using virtual machines in some embodiments—e.g., client and server processes may be implemented on non-virtualized execution platforms such as operating systems running directly on physical hardware in such embodiments. In some embodiments, rack-level alternate communication channels may also be used by service components implemented using virtual machines. Other types of local, fast, alternate communication mechanisms may also be used for client-server interactions in some embodiments, such as local interconnects set up within a single data center room comprising multiple server racks.

It is noted that, depending on the multiplicity of services that are supported in a given distributed system and on the number of service components that can be instantiated at the same instance host, at least some of the service components that happen to be members of a locality group may not need to communicate with other members of the locality group in various embodiments. Such locality group members may continue to use their default request-response pathways. Also, in at least some embodiments, even though a given client component may have reached a local workload agreement with a given server component, this may not preclude the use of the default request-response communication channel by either party to the agreement. That is, a given service component may use both the default communication channel and the alternate communication channel, or either one of the channels, during a given period of time or for some subset of requests or responses.

In at least some embodiments, the alternate communication channel may also or instead be used to establish resource sharing agreements between different members of a locality group. For example, in one embodiment, a client component and a server component within a given locality group may each be assigned or allocated respective units of one or more types of resources by a resource manager for the locality group. On an instance host, for example, the resource manager may be part of the virtualization management software stack, and may allocate chunks or blocks of CPU time to each of the virtual machines instantiated at the host. Similar resource capacity units may also be allocated for I/O (input/output) operations such as disk accesses, network bandwidth usage operations, memory (e.g., one or more blocks of random access memory (RAM) of an instance host, or other types of sharable memory available at an instance host), and the like. A (client, server) pair of the locality group may collectively be able to determine in some embodiments that, at least during some time slots, one component of the pair is likely to be relatively busy, while the other is likely to be relatively idle. In such a scenario, the idle component may be willing to temporarily reduce or even relinquish its resource quota or quotas in favor of the busy component. One or both of the two cooperating service components may, for example, indicate to their resource manager(s) that they are willing to offer resources to the other component based on certain triggering conditions. The triggering condition may, for example, comprise an indication provided to the resource manager by the relinquishing component when a period of low workload at the relinquishing component is anticipated. In some embodiments, the resource manager itself may have access to metrics that indicate the workload levels at the cooperating components, and may use various observed metric thresholds (e.g., an average CPU utilization of less than 20% during a given time period) as the triggering conditions.

In some embodiments, an auxiliary health monitoring mechanism may be implemented among cooperating components of a locality group. The distributed system in which the services are implemented may include a default health monitoring service, comprising for example a plurality of health checking agents configured to transmit heartbeat messages to various components. The service-generated heartbeat messages may utilize the same types of networking protocols (e.g., TCP/IP) and pathways of the internal network that are used for the default communication channels described above. In addition to responding to the service-generated heartbeat messages to indicate their health status to the default health monitoring service, in some embodiments a (client, server) pair of a locality group may also send local heartbeat messages to each other via their alternate communication channel, e.g., after reaching a health monitoring agreement via the alternate channel. The interval between the local heartbeat messages may be dynamically adjusted based on the service-related workload levels at either or both components in some implementations. For example, when both the server and the client component are relatively idle, they may transmit local heartbeat messages to each other more frequently, and when the components are relatively busy with service-related work, they may increase the intervals between heartbeat messages. The lack of responsiveness of the client component to the server component's local heartbeat messages may indicate to the server component that the client component has failed. Similarly, the client component may also be able to detect a server component's failure on the basis of the local heartbeats. In at least some embodiments, the default health monitoring service may not be able to detect a client or server failure as quickly as the failure can be determined using the local heartbeat messages. The default service may be slower due to a variety of reasons—for example, due to the multiple network hops involved in the default heartbeat messages, and the fact that some of the lack of responsiveness from a component to a service-generated heartbeat message could be attributed to temporary network glitches or network delays. In addition, the type of failure may be more easily established using the local heartbeats (since network hops may not be involved in the auxiliary mechanism, it may be possible to eliminate network partitioning as a cause of non-responsiveness detected using the alternate communication mechanism). In some embodiments, the service component that detects a failure of another member of the locality group using local heartbeats may notify the health monitoring service regarding the failure, so that, for example, recovery actions may be initiated more quickly than might have been possible using the default health monitoring mechanism alone.

In environments in which the default communication channel between a client and a server includes a load balancer, the diversion of some of the request-response workload to the alternate channel may potentially disrupt the load balancing technique being implemented. For example, consider a server component S1 with a capacity to handle up 100 service requests per second. A load balancer LB1, unaware of any local workload agreements reached by S1 within its locality group may, for example, typically direct 60 service requests per second to S1. If S1 enters into a local workload agreement with a client component C1 to accept up to 50 service requests per second from C1 alone via an alternate channel, and LB1 continues to direct 60 requests per second to S1, then S1 may quickly become overloaded. Accordingly, in at least some embodiments, indications of the local workload agreement may be provided to the load balancers that may be affected by the change in available capacity of the service components involved.

Example System Environment

FIG. 1 illustrates an example system environment in which placement-dependent communication channels between service components may be used, according to at least some embodiments. As shown, system 100 includes a provider network 102 that includes a plurality of execution platforms (EPs) 110 at which client and server components of various services may be implemented. In different embodiments, the execution platforms 110 may comprise virtual machines or compute instances implemented at instance hosts, operating systems running directly on hardware without a virtualization management software stack, or some combination of virtualized and non-virtualized computing devices.

The service components of a plurality of network-accessible services implemented at provider network 102 may be distributed among the various execution platforms 110 by one or more placement services 115, based on various policies and constraints. Neither external service customers 133 (e.g., end users of services implemented within the provider network) nor internal service customers 134 (e.g., other services or applications implemented within provider network 102) may have fine-grained control over exactly where client and server components are instantiated in the depicted embodiment. Service components are identified by labels of the form SvcJ-SvrK (the Kth server component of service J) and SvcJ-CliK (the Kth client component of service J) in FIG. 1. Only subsets of the components of several services are illustrated in FIG. 1 due to space constraints. One server component of service 1 (Svc1-Svr1) is shown instantiated at execution platform 110A, and a server component Svc2-Svr5 of service 2 is shown at EP 110K. Some client components of service 1 (Svc1-Cli5, Svc1-Cli7) are shown at EPs 110C and 110L respectively. In addition, client components Svc2-Cli3 (of service 2) and Svc4-Cli2 (of service 4) are shown at EPs 110B and 110M respectively.

Default communication channels may be established for request-response traffic between client and server components of a given service using various components of an internal network 144 of the provider network, including various load balancers 120 (indicated by the labels "LB") such as LB 120A and 120B. For example, by default, client Svc1-Cli7 component and server component Svc1-Svr1 may be configured to communicate using link 170C, 170A and load balancer 120A. Similarly, the default pathway for communications between Svc1-Cli5 and Svc1-Svr1 may include links 170B, 170A and load balancer 120A, and the default channel for communications between Svc2-Cli3 and Svc2-Svr5 may include links 170D and 170E via load balancer 120B. The default pathways may utilize packet-switched networking protocols (such as various TCP/IP protocols, X.25, frame relay, or multiprotocol label switching (MPLS)) in at least some embodiments. At least some of the client-server interactions over the default communication channel may occur at the application layer(s) of the networking protocol being used, e.g., using a variant of HTTP. Any appropriate combination of connectionless or connection-oriented protocols may be used in various embodiments for the default channel.

For various service components that happen to be instantiated using common resources such as a single instance host or a single rack, alternate communication channels (ACCs) 150 may be available in some embodiments. For example, in a scenario in which EPs 110A, 110B and 110C are each respective virtual machines on the same instance host, a fast communication bus may represent an ACC 150A available to at least the service components Svc1-Svr1, Svc2-Cli3, and Svc1-Cli5. Similarly, if EPs 110K, 110L and 110M are each implemented using hardware servers mounted on the same rack, an ACC 150B available for inter-component communications among Svc2-Svr5, Svc1-Cli7 and Svc4-Cli2 may be implemented using SCSI, HIPPI, fibre channel, or even a local TCP/IP sub-network. The set of service components (and/or their execution platforms) to which a particular alternate channel of communication is accessible may be referred to as a locality group 125. Thus, in FIG. 1, locality group 125A represents entities that have access to ACC 150A, and locality group 125B represents entities that have access to ACC 150B. Not all the service components or execution platforms may have access to an ACC in some embodiments—for example, some instance hosts may not have a local communication bus configured for instance-to-instance communications, and not all server racks may have associated local sub-networks. Furthermore, when a service component is launched, it may not be aware that an ACC is accessible, and may therefore not be aware that there may be other service components that have access to a shared non-default communication channel. In at least some embodiments, one or more ACCs 150 may not utilize TCP/IP or other similar packet-switched networking protocols, but may for example utilize writes and reads to shared memory buffers for inter-component communications.

A given service component, such as Svc1-Svr1, may discover that an ACC such as a local communication bus is available to it, e.g., using one or more system calls available at its execution platform in the depicted embodiment. Messages transmitted via the ACC may be used by one service component to identify other service components that also have access to the ACC. A server component such as Svc1-Svr1 may for example broadcast or transmit an advertisement message over the ACC, comprising an indication of the component's capabilities (e.g., one or more request types to which the first component is capable of responding via the ACC). Other components, such as Svc1-Cli5 and Svc2-Cli3, that have access to the same ACC may have registered as listeners for such broadcast messages (e.g., the other components may have indicated to the ACC that such broadcast messages are to be delivered to them). A given listening component may detect and examine the contents of a broadcast message and determine whether they wish to interact with the broadcast source or not. For example, Svc2-Cli3 may decide that it has no interest in the capabilities offered by Svc1-Svr1, and may therefore take no further action with respect to a broadcast advertisement from Svc1-Svr1. On the other hand, Svc1-Cli5 may examine the advertisement and decide (if the server component is capable of responding to at least some types of service requests generated by Svc1-Cli5) that it may be beneficial to have some service requests fulfilled by Svc1-Svr1 using ACC 150A. Accordingly, a negotiation may commence between Svc1-Svr1 and Svc1-Cli5, involving one or more messages exchanged between the two components, at the end of which a local workload agreement may be reached. In accordance with the local workload agreement, a set of service requests may be directed from the client component Svc1-Cli5 to the server component Svc1-Svr1 via ACC 150A, bypassing the default communication channel involving LB 110A. Responses to the requests may also be provided to Svc1-Cli5 via the ACC 150A, again bypassing the default server-to-client communication channel.

The process of discovering matching clients and servers, and reaching local workload agreements, may be initiated by client components instead of, or in addition to, being initiated by server components in some embodiments. Thus, client component Svc1-Cli5 may broadcast or transmit a request advertisement indicating the types of service requests to which it is willing to obtain responses via the ACC 150A, and the server component Svc1-Svr1 may respond to the client's broadcast advertisement to begin the negotiation towards a local workload agreement. In some embodiments, multiple client components of the same service may belong to a given locality group, or multiple server components of the same service may belong to a given locality group. In such cases, multiple local workload agreements may be reached via the negotiation messages. It is noted that additional interactions between the members of a locality group may be required in at least some embodiments, e.g., messages including security credentials may be exchanged using the ACC to ensure that authentication/authorization requirements of the service components are met. Furthermore, in at least some embodiments, indications of the local workload agreements may be provided to the load balancers 120 so that the load balancing parameters may be modified in view of the diversion of some of the service workload to the ACCs.

In some embodiments, cooperating service component pairs (e.g., Svc1-Svr1 and Svc1-Cli5) of a given locality group may also be willing to share allocated resources. For example, in an embodiment in which the client and server components of the pair are each implemented at respective virtual machines of a same instance host, a resource manager component of the virtualization software management stack (VMSS) at the instance host may typically manage the distribution of CPU quotas, memory quotas, I/O quotas, and/or networking bandwidth quotas among the set of instantiated virtual machines. A client component of the locality group, such as Svc1-Cli5, may be able to predict that its own workload level is going to be low during a time interval, and may therefore be willing to transfer some of its allotted resources to a server component such as Svc1-Svr1 for some time periods. A resource sharing agreement associated with the cooperating components may be reached, indicating for example the triggering conditions under which resources are to be transferred, e.g., that X units of CPU time should be transferred to component X from component Y's quota during a time period T1 if component X's average workload level falls below a threshold P during some earlier time period T2. The agreement may be reached via messages exchanged between at least one of the components and the resource manager (e.g., via the ACC or a different communication mechanism). In some embodiments, the triggering conditions may be detectable by the resource manager without specific interactions with the components themselves, or notifications may be provided to the resource manager by the participant components when the triggering conditions are met.

As shown in FIG. 1, in at least some embodiments a health monitoring service (HMS) 117 may be configured within provider network 102. As part of a default health monitoring mechanism of the provider network 102, various health monitoring agents of the HMS 117 may, for example, transmit heartbeat messages to client and server components distributed around the provider network via the internal network 144. The HMS may attempt to determine changes to a component's health status based on the responsiveness of the component to the service-generated heartbeat messages. Such a default health monitoring mechanism may be augmented with an auxiliary health monitoring mechanism using the ACCs in some embodiments. Various cooperating components of a locality group may reach a local heartbeat agreement, in accordance with which they may send local heartbeat messages to each other via their ACC. The components may also continue to participate in the default health monitoring mechanism by responding to the service-generated heartbeat messages as well. Because communications via the ACC may at least in some cases be faster than communications via the channels used by the HMS 117, failures at the service component may typically be detectable faster using the local heartbeat messages than they would be detected by the HMS. When a failure is detected using the auxiliary health monitoring mechanism that involves the use of the ACC, in some embodiments, the component that detects the failure may notify the HMS about the failure, so that remedial operations can be commenced more quickly than might otherwise be possible.

The use of the ACC (as opposed to internal network 144, for example) for health monitoring messages may eliminate some of the uncertainty in identifying a cause of unresponsiveness to heartbeats; for example, network partitioning at the internal network 144 may be ruled out as a cause of unresponsiveness if the ACC is being used. In some embodiments, the intervals between local heartbeat messages may be dynamically adjusted based on the workloads at the service components involved in the auxiliary mechanism—e.g., heartbeat messages may be sent more frequently when one or both components are lightly loaded with other operations, and less frequently when one or both components are heavily loaded. Either the auxiliary health monitoring mechanism, or the resource sharing technique described above, may be implemented among more than two cooperating components in various embodiments. In some cases, the set of components cooperating with regard to resource sharing and/or health monitoring may comprise only one type of component—e.g., either server components alone, or client components alone, may cooperatively monitor each other's health or share resources. In addition, in at least some embodiments, components of different services that have access to the same ACC 150 may reach heartbeat agreements and/or resource sharing agreements, so a given agreement may not necessarily require all the participating entities to be affiliated with a single service of the provider network.

Examples of Non-Default Communication Channels

Figure 2:
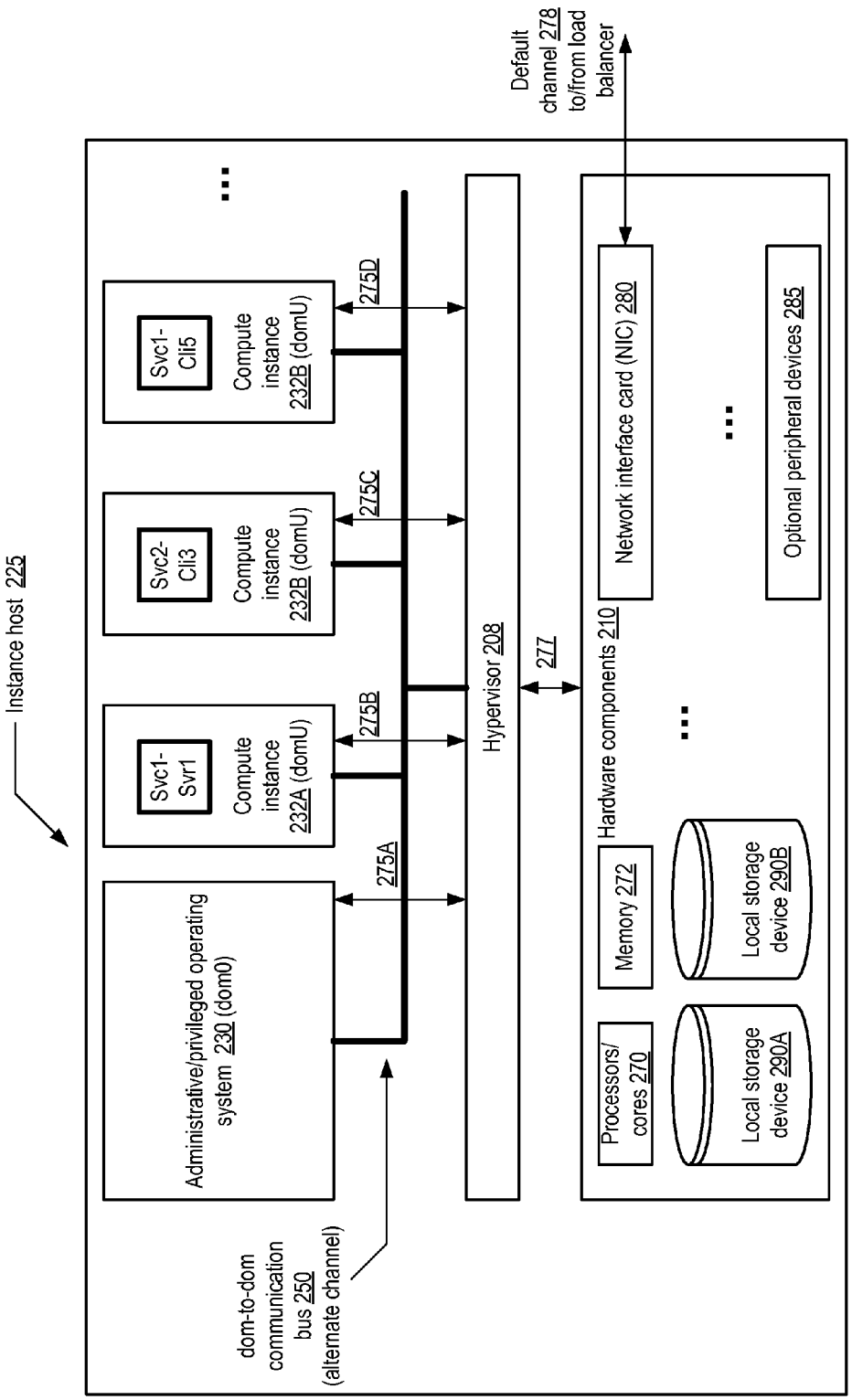
FIG. 2 illustrates example components of an instance host used by a virtualized computing service, according to at least some embodiments.

In various embodiments, the members of a locality group that have access to an alternate communication channel 150 may all be instantiated on the same instance host of a virtual computing service. FIG. 2 illustrates example components of such an instance host 225, according to at least some embodiments. As shown, the instance host 225 may comprise a plurality of hardware components 210, which may include, for example, some number of processing cores or processors 270, at least one non-persistent memory 272 which may be referred to as a main memory, one or more local storage devices 290 such as disks 290A and 290B (which may include rotating disks and/or solid state disks), and one or more network interface cards (NICs) 280. Optional peripheral devices 285 such as one or more monitors, mice, and the like may also be attached to the instance host in some implementations.

The hardware resources of the instance host 225 may be virtualized (e.g., presented to several virtual machines or compute instances 232 booted or launched at the instance host as though each of the instances had exclusive access to the hardware) with the help of a virtualization management software stack that comprises a hypervisor 208 and/or an administrative instance of an operating system 230 in the depicted embodiment. The administrative instance of the operating system may be referred to as a "privileged domain" labeled "domain 0" or "dom0" in some implementations, while respective operating systems established for each of the compute instances 232 may be referred to as "unprivileged domains" (labeled "domU"), "guest virtual machines", "guest operating systems", or "guest domains". When a hardware component is to be utilized by a compute instance 232, e.g., due to an operation requested by the operating system or by an application running on top of the operating system, the hypervisor 208 may typically act as an intermediary between the instance and the hardware component, as indicated by the arrows 275B, 275C, 275D and 277 in the depicted embodiment. In some cases, depending for example on the programmatic interfaces being used, both the hypervisor and the administrative operating system instance 230 may be intermediaries between the instance and the hardware. For example, the request path for an operation may flow as follows: domU-> hypervisor-> dom0-> hypervisor-> hardware, and the response may be provided to the instance using the reverse path. In some implementations, dom0 may be able to directly access one or more types of hardware components; other interactions between dom0 and the hardware may pass through the hypervisor (as indicated by arrow 275A).

The default channel 278 for communications between service components running at various instance hosts 225 of the provider network may involve network traffic from (or to) instances 232, transmitted via NIC 280, and processed using software networking stack modules of the guest virtual machines, dom0, and/or the hypervisor 208. In the depicted embodiment, a local communication bus 250 may be implemented, representing an alternate communication channel 150 that can be used for communication between components that are all implemented within the instance host. The local communication bus may in some embodiments be referred to as a dom0 communication bus (as it facilitates interactions among dom0 and the domUs), or as a dom-to-dom communication bus. The local communication bus may involve writing to, and reading from, shared memory structures such as ring buffers by the participating service components and/or compute instances, typically using low-level programmatic interfaces similar to those used for device drivers. Programmatic interfaces may be supported, for example, to allow components such as Svc1-Svr1, Svc2-Cli3, and Svc1-Cli5 to broadcast messages on the bus 250, to register as listeners on the bus for broadcasts from other components, and so on. In at least some embodiments, the hypervisor 208 and dom0 itself may also use the communication bus 250 for various purposes, such as to monitor broadcasts from other components, determine the contents of various cooperation agreements (such as local workload agreements, resource sharing agreements, or heartbeat agreements of the types described above), and/or to communicate with instances 232.

Figure 3:
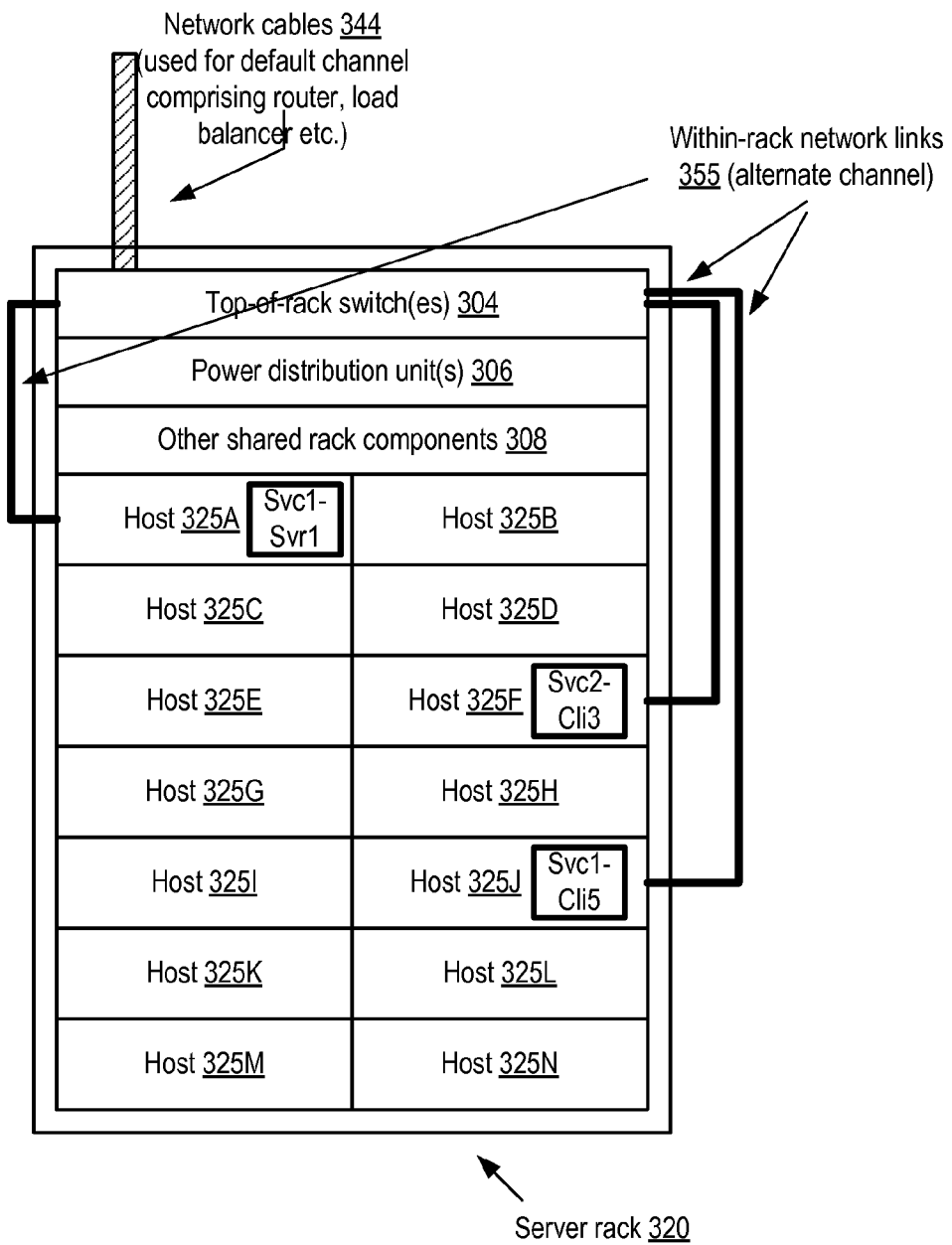
FIG. 3 illustrates an example of an alternate communication channel configured between service components hosted at a particular server rack, according to at least some embodiments.

In some embodiments alternate communication channels may be implemented at a rack level instead of, or in addition to, at the instance host level. FIG. 3 illustrates an example of an alternate communication channel configured between service components hosted at a particular server rack, according to at least some embodiments. As shown, server rack 320 may comprise several hosts 325, such as hosts 325A-325N, which may incorporate various service components such as Svc1-Svr1, Svc1-Cli5 and Svc2-Cli3 at hosts 325A, 325J and 325F respectively. The hosts shown mounted on rack 320 may share some set of resources, including for example top-of-rack network switch 304, power distribution units 306 and other shared components 308 such as network threat management appliances and the like. Some or all of the hosts 325 may in some embodiments be used for instantiating virtual machines, while in other embodiments the hosts 325 may not employ virtualization, and may simply implement operating systems on top of physical hardware. One or more shared top-of-rack network switches 304 may enable connectivity to the internal network 144 of the provider network (as well as external networks) via a set of network cables 344. The pathways via the network cables 344 between the service components instantiated at the hosts 325, and other service components instantiated at hosts on other racks, may represent the default client-server communication channel in the depicted embodiment.

In the embodiment depicted in FIG. 3, at least a subset of the server components instantiated at the hosts 325 of the rack 320 may have an alternate communication channel configured, comprising for example a sub-network that includes physical network links 355 between the hosts and the top-of-rack switch(es). In some embodiments, changes to network configuration settings at the participating hosts 325 and/or the top-of-rack switches 304 may be sufficient to establish the alternate channel, while in other embodiments additional networking-related hardware such as auxiliary network cables, NICs, or other devices may be used. In some embodiments, SCSI, HIPPI, fibre channel, or other types of interconnects that may not utilize packet switching may be used for the alternate communication channel. From the perspective of local workload agreements, resource sharing agreements (e.g., sharing bandwidth or power), and/or heartbeat agreements, the rack-based alternate communication channel may be considered functionally similar to the bus-based channel illustrated in FIG. 2. In some embodiments in which the hosts 325 are employed by a virtualized computing service for implementing compute instances 232, multiple types of ACCs may be used concurrently. For example, in one such embodiment members of a first locality group that includes a server S1 and a client C1 may communicate via a dom-to-dom communication bus, while members of another locality group that includes S1 and a different client C2 may communicate via a rack-based ACC.

Discovery and Negotiation Interactions

Figure 4A:
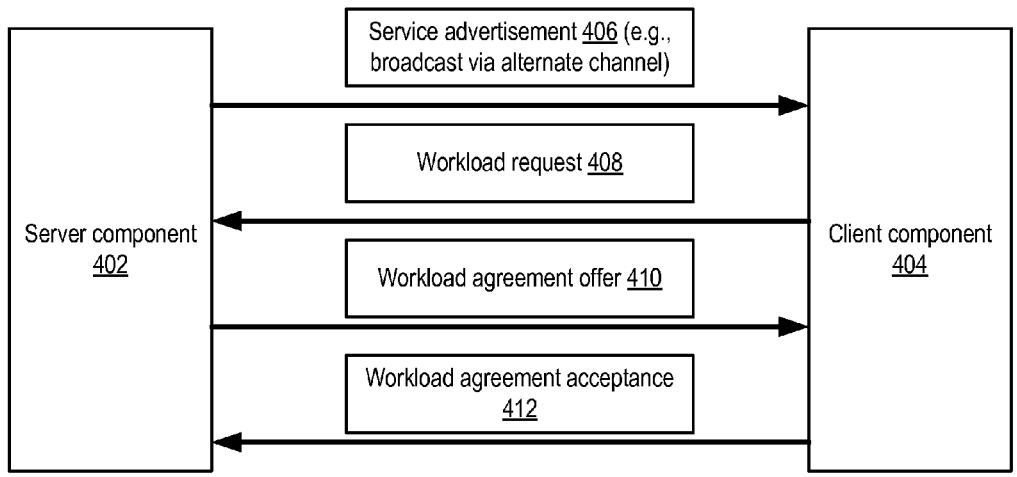
FIGS. 4a and 4b illustrate example interactions between server components and client components to arrive at a workload agreement via a placement-dependent communication channel, according to at least some embodiments.
Figure 4B:
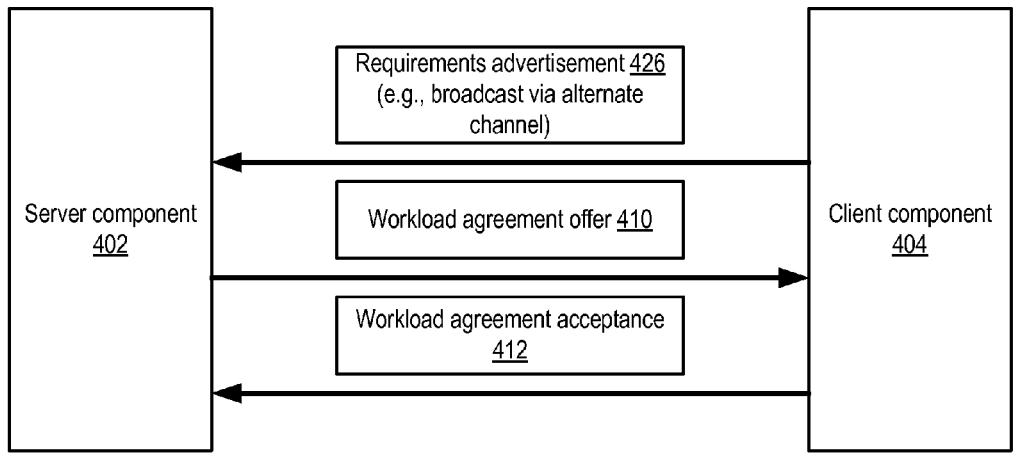

FIGS. 4a and 4b illustrate example interactions between server components and client components to arrive at a workload agreement via a placement-dependent communication channel, according to at least some embodiments. As shown in FIG. 4a, a server component (e.g., Svc1-Svr1 of FIG. 1) may distribute a service advertisement 406 (which may also be referred to herein as a server component advertisement) via the ACC 150. The service advertisement 406 may indicate, among other server characteristics (such as those shown in FIG. 5a and described below), the kinds of service requests to which the server component is capable of responding via the ACC. In some implementations, a programmatic broadcast interface may be used for the server's advertisement, while in other embodiments messaging techniques other than broadcasting may be employed.

A particular client component 404 may detect the advertisement (e.g., as a consequence of having registered as a listener on the ACC using an API exposed by the ACC) and determine that it may be beneficial to have some of its service requests be directed via the ACC to the advertising server component 402. Accordingly, a process of negotiating a local workload agreement may be initiated. In the depicted embodiment, the client 404 may submit a workload request 408 to the server 406 via the ACC, indicating its specific workload requirements. The server 406 may in turn transmit a workload agreement offer 410, indicating its acceptance of the client's workload (or at least a part of the workload). The client 404 may then send a workload agreement acceptance 412 to the server 402 via the ACC. Of course, either the server 402 or the client 404 may instead terminate the negotiation in the depicted embodiment if the workload request or the agreement offer is not acceptable to both parties. In some implementations, the negotiation messages may be transmitted via a different channel than the ACC (e.g., via the default channel). After the workload agreement is reached, the client 404 may begin submitting work requests via the ACC to the server 402, and the server may respond to the requests via the ACC.

In at least some embodiments, the discovery process may be initiated by a request advertisement 426 sent (e.g., via an ACC broadcast) by the client component 404, as indicated in FIG. 4b, instead of or in addition to the server component issuing a service advertisement as shown in FIG. 4a. The client request advertisement may indicate the specific types of service requests targeted by the client for local servers, the volume or rate at which the client would like such requests to be fulfilled, and so on. A server component 404 may detect the request advertisement, determine that it is capable of meeting at least some of the client's requirements, and transmit a workload agreement offer 410 to the advertising client. The client may accept the workload agreement offer and respond with an acceptance message 412. Negotiation steps other than those illustrated in FIGS. 4a and 4b may be used—for example, separate steps may be required for authenticating each of the participants to the other, or additional negotiations regarding billing or pricing may be required. Any appropriate messaging approach may be used for each of the interactions illustrated in FIGS. 4a and 4b, including broadcasts, multicasts, relay-oriented messaging in which each recipient relays a received message that is not directed to itself, semaphore-based messaging, one-to-one communications, and so on.

FIGS. 5a and 5b illustrate example elements of a service component advertisement 500 and a client request advertisement 550 respectively, that may be transmitted over a placement-dependent communication channel, according to at least some embodiments. As shown, a service component advertisement 500 may include a globally unique identifier (GUID) 510 of the server component 402 responsible for the advertisement, as well as some set of server-side security metadata 511 (e.g., one or more keys, certificates, or credentials that are to be used to secure interactions with the server component). The types of service requests that the server component is capable of handling via the ACC may be indicated in element 512. In some embodiments, the server may provide an indication or estimate 514 of performance benefits that could be attained by clients that decide to use the ACC for their requests instead of using the default channel—e.g., response times achievable (or actually measured) via the ACC pathway may be provided and contrasted with response times achievable (or measured) via the default channel.

In some embodiments, indications of pricing policies 516 applicable to service requests handled via the ACC may be included in the server's advertisement. A customer may be billed different amounts per service request in such embodiments depending on whether the request is handled via an ACC or via the default channel. In some cases, the pricing may be dependent on the performance benefits obtained, or may depend on the duration of the workload agreement reached. Service operators that wish to encourage the use of the ACCs may set lower prices for ACC-based service request handling in some embodiments than the prices set for service request handling via the default channels. In some embodiments, the service advertisement 500 may include an indication of capacity constraints 518 of the server component—e.g., the maximum rate at which it is willing to accept service requests via the ACC may be indicated.

In some embodiments in which resource sharing negotiations are conducted between service components via the ACC, information 520 about the resource sharing protocol (such as the extent to which the server is willing to share resources, the triggering conditions that could lead to resource sharing, and the like) may also be disseminated via the service advertisement 500. Health monitoring protocol information 522 pertinent to the types of auxiliary health monitoring mechanisms described above, such as whether the server is willing to participate in a local heartbeat exchange via the ACC, may also be included within the service advertisement in some embodiments.

As described above, in some embodiments a client component 404 may broadcast or otherwise transmit a requirements advertisement 550 via an ACC 150. The requirements advertisement 550 may include a GUID 560 identifying the client, as well as client-side security metadata 561 (such as keys, certificates, credentials, and the like that can be used to secure interactions with the client). The targeted request types 562 that the client would like to be able to submit via the ACC, as well as corresponding performance/capacity requirements 564 (such as maximum acceptable latencies, minimum request rates etc.) may be included in the client's advertisement in at least some embodiments. A client may use the advertisement to indicate pricing constraints 566 (e.g., maximum billing rates for ACC-based service requests) that a server would have to meet in order to reach a local workload agreement in one embodiment. Client-side information about a resource sharing protocol 570 (e.g., the conditions under which the client is willing to share resources, the types of resources it is willing to share, etc.) and/or a health monitoring protocol 572 (e.g., whether the client is willing to participate in a local heartbeat exchange) may also be provided in the client's advertisement in some embodiments. In at least one embodiment, the kinds of information illustrated in FIGS. 5a and 5b may be exchanged in several different communications between a given client and server pair, instead of being included within a single message. In various embodiments, not all the kinds of information shown may be included within the advertisements, or additional types of information may be included.

Resource Sharing by Cooperating Service Components

Figure 6:
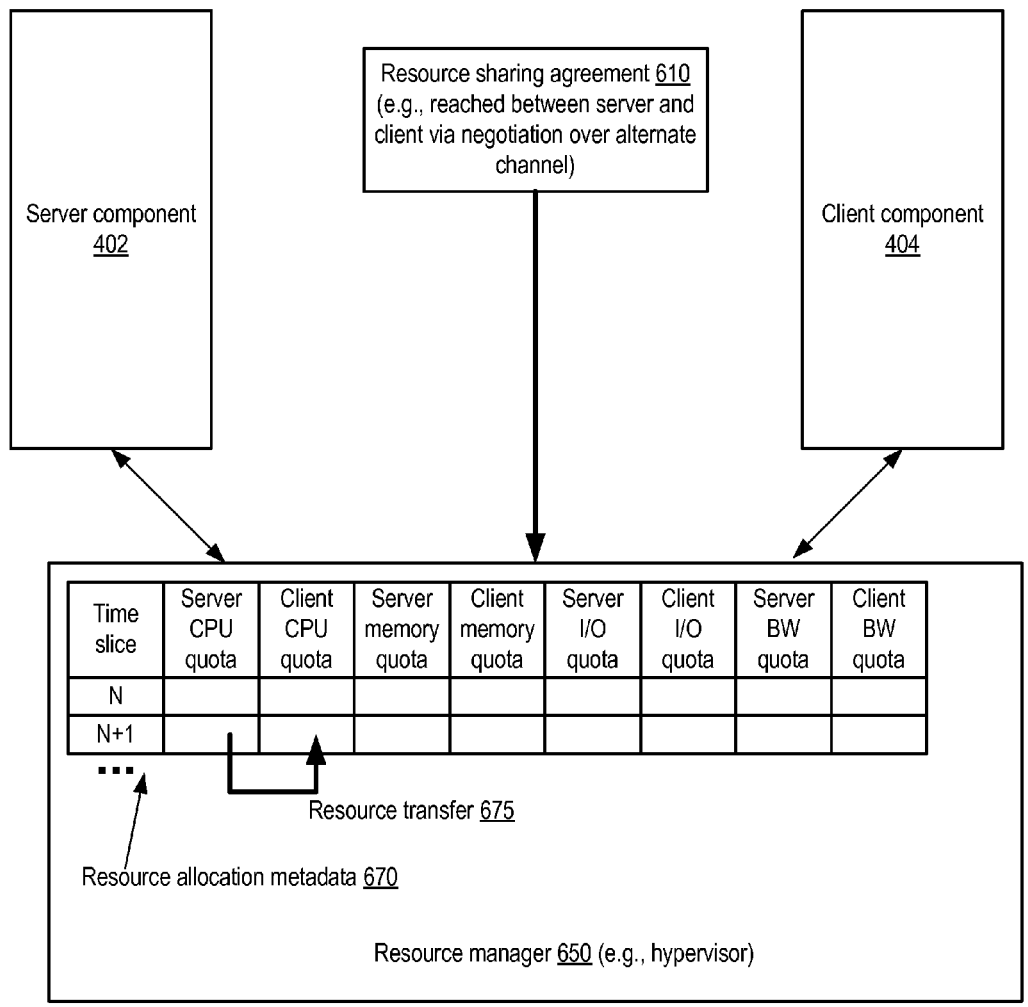
FIG. 6 illustrates an example of resource sharing in accordance with an agreement that may be reached between service components that have access to a placement-dependent communication channel, according to at least some embodiments.

FIG. 6 illustrates an example of resource sharing in accordance with an agreement that may be reached between service components that have access to a placement-dependent communication channel, according to at least some embodiments. A resource manager 650 may be responsible for allocating resource capacity to the execution platforms (such as compute instances) at which the service components run. In embodiments in which the placement-dependent communication channel is a communication bus accessible to several service components at a single instance host, for example, the resource manager 650 may be implemented as one or more modules within the hypervisor or in other parts of the virtualization management software stack. Capacity for several different types of resources may allocated to various execution platforms (and hence to the service components executing there) in various units, including for example computation cycles or CPU time blocks, blocks of memory within one or more memory modules, I/O operations per time slot, network requests or bandwidth usable per time slot. In the depicted embodiment, as shown, resource allocation metadata 670 may be logically organized on a per time-slot basis, with respective resource quotas being assigned to each of the different execution platforms for each of the different resource types. Respective quotas may be determined for client and server execution platform CPU resources, memory resources, I/O resources, and network bandwidth (BW) resources, for example.

In some embodiments, the execution platforms may be used primarily for the service components, and as a result the service components may account for the majority of the utilization of various platform resources such as CPU cycles, memory, network bandwidth, or disk. Thus, at least to a first approximation, decisions about resource allocation for the execution platforms may be made based on the requirements and workloads of the service components alone, without assigning much importance to other programs that may also be running on the execution platforms. In a manner similar to the negotiation protocol described above with respect to local workload agreements, cooperating client and server components of a given locality group may arrive at a resource sharing agreement 610 in the depicted embodiment. In accordance with such an agreement, the resource manager 650 may be permitted to transfer at least a subset of allocated resources of one or more types from one component to another under specified triggering conditions. For example, a client component C1 and a server component S1 may have reached a local workload agreement in which up to a negotiated number R of service requests per second can be submitted by C1 to S1 via the ACC. If, during a given time interval, the client component C1 expects to issue no more than 0.25 R requests (based on trend analysis of the end-user work request rate that is being handled by C1, for example), C1 may be willing to give up half its CPU quota for one or more resource management time slots to S1. This may be helpful to S1 as S1 may also concurrently be handling other requests from other client components. Thus, an estimation that C1's workload is expected to be lower than 0.25 R may serve as the triggering condition, and the fraction of CPU quota to be transferred to S1 from C1 may be set to half in the resource sharing agreement 610 in this example. Accordingly, if the triggering condition is met for slot N+1, a CPU quota transfer (indicated by the arrow labeled 675) may be orchestrated by the resource manager 650. Quotas for any of the different types of resources being managed may be transferred in various embodiments, depending on the terms of the resource scheduling agreement. Resource sharing agreements may be either bidirectional or unidirectional in various embodiments—e.g., either participating component may be willing to relinquish some of its resources to the other in some cases, or only one of the participants may be willing to transfer its allocated resources. The ability to transfer resource capacity allocation from a component expected to be underutilized during some time period, to a different component that may well be extremely busy during that same time period, may help to increase the overall resource utilization levels of the hardware platforms being used. It is noted that similar resource sharing agreements may also be implemented for at least some shared resources (such as electrical power, or rack-level network bandwidth in scenarios in which rack-switch-based ACCs are used) among non-virtualized service components in some embodiments.

In at least one embodiment, a given service component may enter into a unilateral resource relinquishment agreement with the resource manager, instead of negotiating a resource sharing agreement with any one specific service component of its locality group. In such an embodiment, the service component may simply donate its resources for re-allocation by the resource manager during specified time intervals based on a triggering condition, and leave decisions regarding the assignment of those resources to specific members of the locality group to the resource manager. Thus, the resource manager may allocate the relinquished capacity to the busiest execution platform among the platforms it is managing, and the recipient of the resources may or may not be a component of the same service as the donor.

Auxiliary Health Monitoring Mechanism

Figure 7:
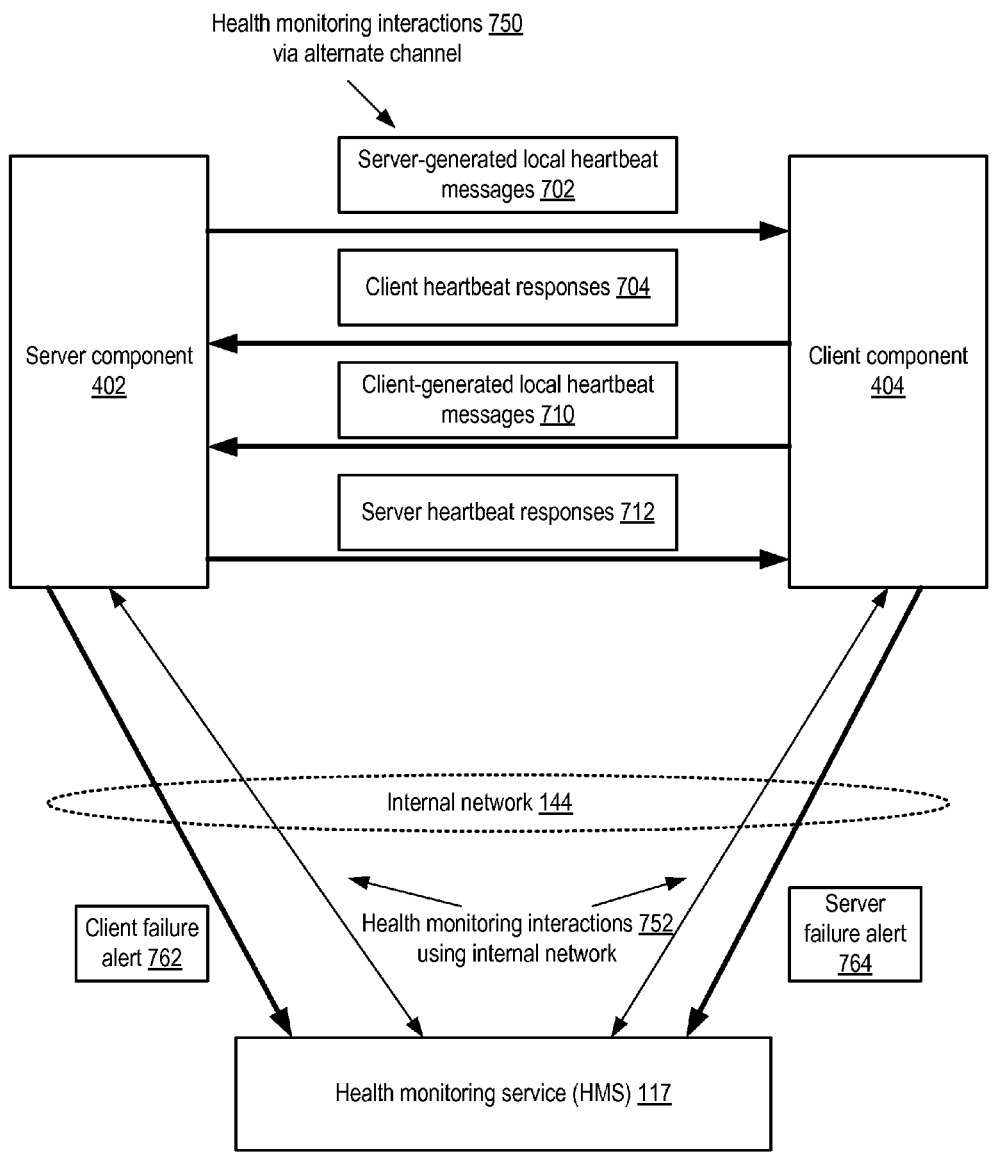
FIG. 7 illustrates example health-monitoring interactions between service components via a placement-dependent communication channel, according to at least some embodiments.

FIG. 7 illustrates example health-monitoring interactions between service components via a placement-dependent communication channel, according to at least some embodiments. In the depicted embodiment, a health monitoring service (HMS) 117 may be the entity with primary responsibility for tracking the health status of various resources of a distributed system such as a provider network, including the client and server components of various services. In accordance with a default health monitoring mechanism employed in the distributed system, heartbeat messages may be transmitted from various agents of the HMS 117 to the various service components via an internal network 144 of the distributed system, and responses to the heartbeat messages may also be received over the internal network. Such default health monitoring interactions 752 may also involve the use of load balancers in some implementations—e.g., load balancers, which are already in frequent communication with the monitored service components, may serve as health monitoring agents or be used to transmit heartbeat messages by the health monitoring agents.

In the depicted embodiment, a pair of cooperating service components 402 and 404 that belong to a locality group with an ACC 150 may reach a local heartbeat agreement. In accordance with the agreement, which may involve negotiation messages similar in concept to those described earlier with regard to local workload agreements, the server component 402 may transmit local heartbeat messages 702 using the ACC to the client component 404, and the client component 404 may transmit local heartbeat messages 710 to the server component 402. Each component may measure the responsiveness of the other to the heartbeat messages sent, e.g., by measuring the time taken to receive client heartbeat responses 704 at the server 402, and the time taken to receive server heartbeat responses 712 at the client. Both components may also continue to respond to the service-generated heartbeat messages send by the HMS via the internal network 144 in at least some embodiments. Thus, in the depicted embodiment, the ACC may serve as the pathway for an auxiliary health monitoring mechanism that enhances the health management capabilities of the distributed system as a whole. If and when either component 402 or 404 detects that the other is unresponsive to some predetermined number of local heartbeat messages, the HMS may be notified. As shown, the server component 402 may direct a client failure alert 762 to the HMS in case the client becomes unresponsive, and the client component 404 may submit a server failure alert 764 to the HMS in case the server becomes unresponsive.

The local heartbeat mechanism may enable failures (such as unexpected process exits) to be detected faster than may have been possible with the default health monitoring mechanism alone. In some implementations, the rate at which local heartbeat messages are issued by the client and/or server components may be dynamically varied as the service-related (as opposed to heartbeat-related) workload fluctuates at the components. During relatively idle periods, local heartbeat messages may be sent more frequently than during more busy periods, for example, further decreasing the average time it might take to detect a failure. Furthermore, the type of failure that has occurred may be identified with greater certainty than if the default mechanism alone were being used, because problems at the internal network may be eliminated as a cause of unresponsiveness when the ACC is being used for the heartbeats instead of the internal network.

It is noted that in various embodiments, with respect to either resource sharing or auxiliary health monitoring, any number of service components of a given locality group may cooperate with each other concurrently. Thus, for example, resources may be shared among a triplet (Server, Client1, Client2), or (Server1, Server2, Client1) or any other larger group with access to a shared ACC. Similarly, local heartbeat messages may be exchanged by any number of components via a shared ACC. Some service components of a given service that happen to have access to a given ACC may decide not to cooperate with each other in some embodiments, e.g., either for local workload agreements, resource sharing agreements, health monitoring, or for some combination of the three. An ACC may be used concurrently with the default communication channels in at least some embodiments, and either type of communication channel may be used as a fallback in the event of a failure at the other in at least some embodiments.

Methods Utilizing Placement-Dependent Communication Channels

Figure 8:
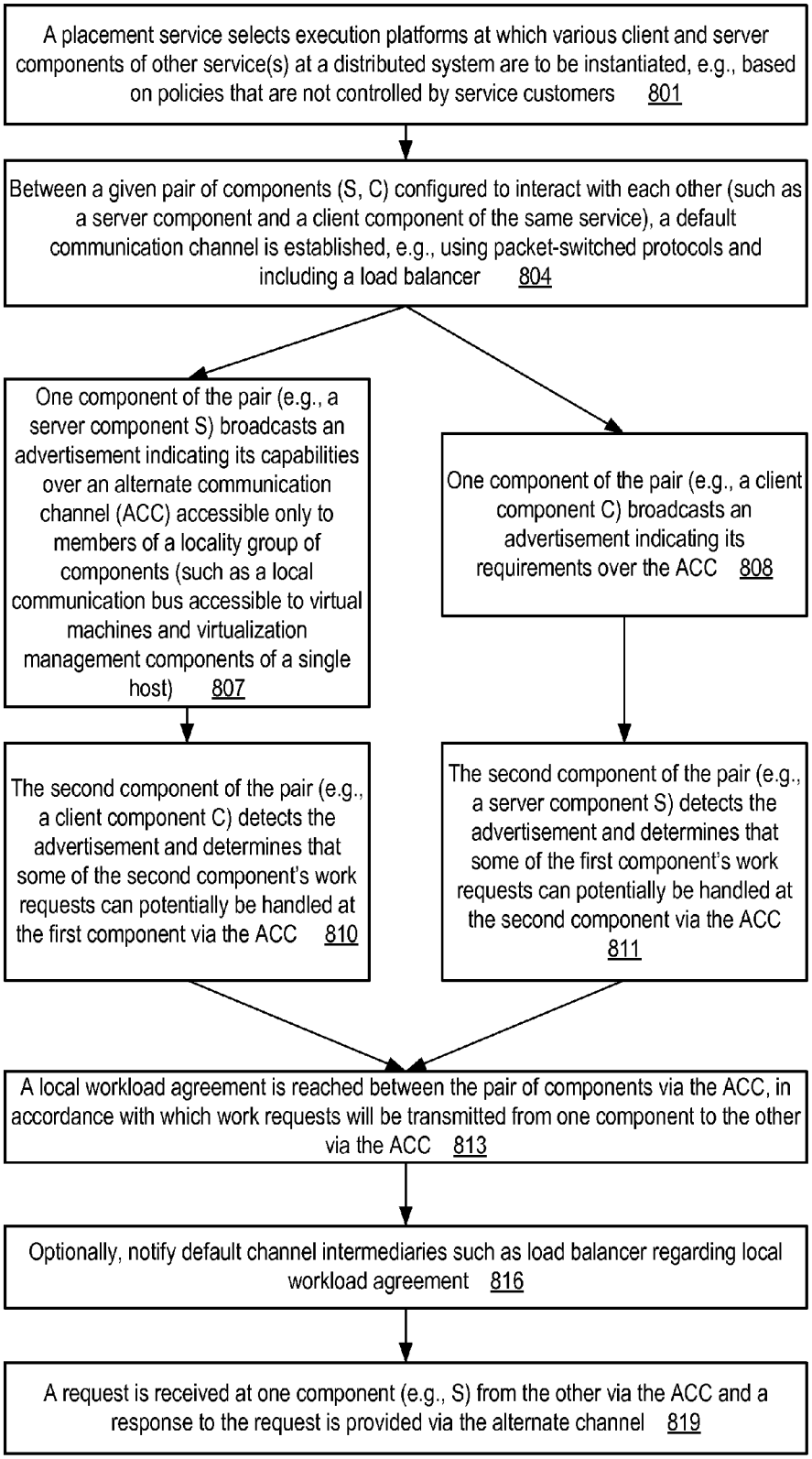
FIG. 8 is a flow diagram illustrating aspects of operations that may be performed to utilize a placement-dependent communication channel, according to at least some embodiments.

FIG. 8 is a flow diagram illustrating aspects of operations that may be performed to utilize a placement-dependent communication channel, according to at least some embodiments. As shown in element 801, a placement service of a distributed system such as a provider network may be used to select execution platforms for client and server components of various network-accessible services. The placement service may do so on the basis of policies over which the service customers do not necessarily have much control— e.g., policies that attempt to maximize hardware utilization, minimize power and other costs, take current network traffic conditions into account, and so on. As a result, from the perspective of the customers of the services, the selection of a particular execution platform (e.g., compute instance or non-virtualized host) for a given server or client component is instantiated may appear to be quasi-random or non-deterministic, even though from the placement service's perspective, the selection may be done using policy logic.

Between any given pair of service components that need to interact to accomplish their functionality, such as a server and client component of the same service, a default communication path may be established (element 804). In some environments, the default path may involve the use of a load balancer configured to distribute client requests among a plurality of servers. Any appropriate networking protocol may be used for the default communication channel in various embodiments, such as a packet-switched protocol of the TCP/IP family. The application layer of the networking protocol may be used for at least some client-server interactions conducted via the default communication channel in various embodiments. In at least some implementations, a communication between a client and a server may involve at least two network hops in each direction: one from the source of the communication to the load balancer, and one from the load balancer to the destination of the communication. In practice, many more hops may be required, depending on the size and layout of the internal network being used for the default channels. The latency associated with the default communication channel may include the time taken for network-related processing at either end and at intermediaries such as one or more load balancers, switches and the like, in addition to the transmission times over the network links involved.

Some pairs (C, S) of client and server components may end up being instantiated near each other at execution platforms at which alternate communication channels (ACCs) are available for inter-component communications. For example, in embodiments in which compute instances of a virtual computing service are being used as the execution platforms, both components of a (C, S) pair may be implemented at respective compute instances on the same instance host, and the virtualization software management stack at that instance host may implement a communication bus that can be used as an ACC. The set of entities or service components that can utilize such an ACC on the basis of proximity of the set's members to each other may be termed a locality group. ACCs may be configured for components that are executing on several different hosts of a server rack in some embodiments, e.g., using SCSI, HIPPI, fibre channel, or the physical links between the hosts and a rack-level network switch. Neither C nor S may initially (e.g., when instantiated) be aware that there may be matching service components with access to a shared ACC in at least some embodiments. A discovery process may be initiated by either type of component, e.g., to identify other components that have access to the ACC and/or to determine whether some service requests should be handled via the ACC. The server component S of such a pair may broadcast (or otherwise transmit) an advertisement on the ACC (element 807), indicating a set of its capabilities such as its ability to respond to certain types of service requests via the ACC. The advertisement may be accessible to other members of the locality group that may, for example, have registered themselves as listeners on the ACC. The client component C may detect the advertisement and decide that it could benefit from the services being offered via the ACC by the server component (element 810), e.g., by having some of its own service requests fulfilled by the advertiser.

In at least some embodiments, the client component C may issue its own advertisement via the ACC, indicating for example the kinds of service requests it needs to have fulfilled (element 808). The server component S may detect the client's advertisement (element 811) and determine that some of the client's service requests can be processed by the server. In some embodiments, both client and server components may issue their respective advertisements, indicating their service needs and/or capabilities. In other embodiments, only server components may generate advertisements, and client components may be expected to detect the server advertisements and respond. In yet other embodiments, only client components may generate advertisements, and server components may be expected to detect them and respond.

The two service components may initiate a negotiation, e.g., conducted via some number of messages exchanged via the ACC, to arrive at a local workload agreement (element 813). The negotiation may involve several steps in some embodiments, including for example authentication or security-related exchanges to ensure that each participant can trust the other. The local workload agreement may cover various aspects of cooperation between the pair of components, such as the type and rate of service requests the server is willing to handle and the client is willing to submit, the pricing/billing policy associated with the requests handled via the ACC, and so on. In at least some embodiments, in order to enable the load balancer (or balancers) on the default communication channel to adjust its behavior in view of the diversion of the workload to the ACC, an indication of the workload agreement may optionally be sent to entities associated with the default channel (element 816). After the agreement is reached, the client component may submit a service request via the ACC to the server component, and the server component may perform the requested operations and provide a response via the ACC (element 819).

Figure 9:
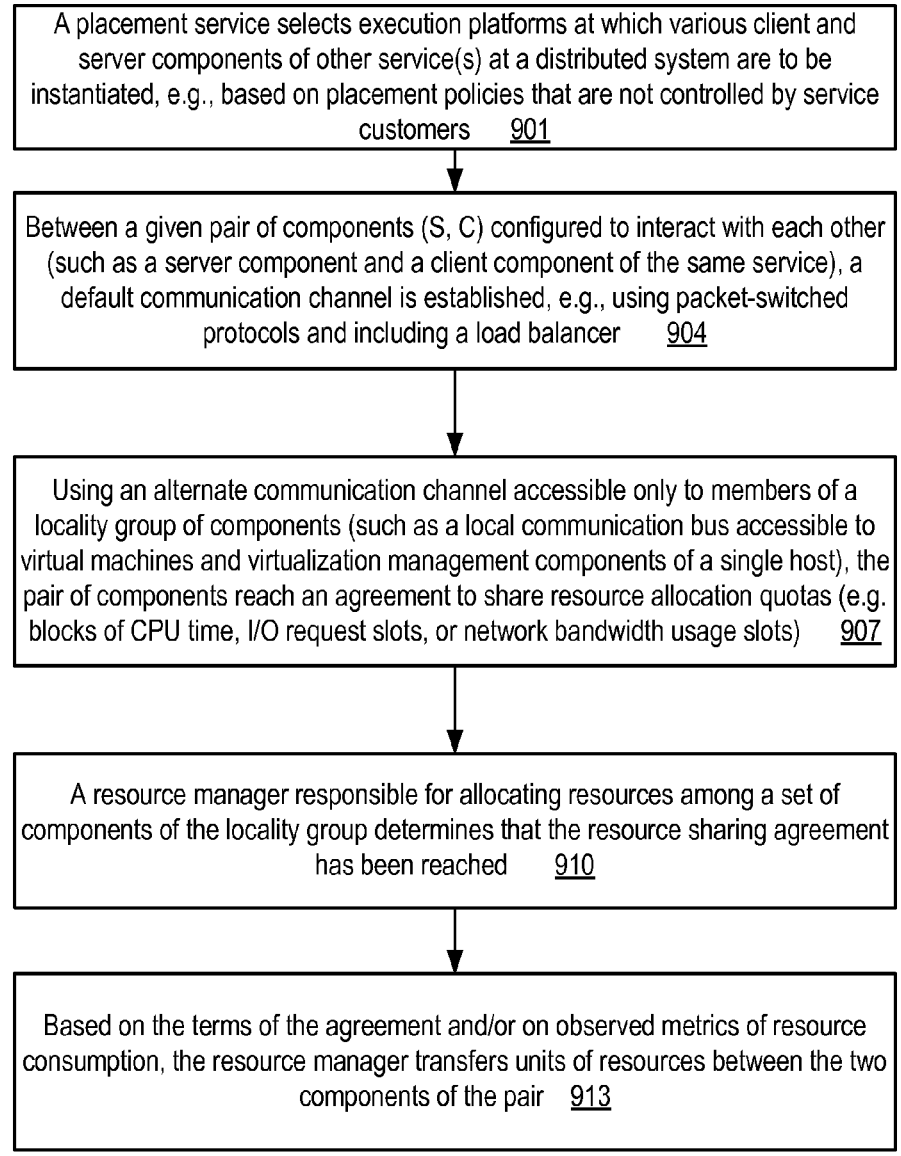
FIG. 9 is a flow diagram illustrating aspects of operations that may be performed to share resources among service components that have access to a placement-dependent communication channel, according to at least some embodiments.

FIG. 9 is a flow diagram illustrating aspects of operations that may be performed to share resources among service components that have access to a placement-dependent communication channel, according to at least some embodiments. As shown in element 901, a placement service may select execution platforms at which various service components of a distributed system are to be instantiated, using policies that may not be controlled by the customers of the services. As a result, the components may be distributed in apparently unpredictable ways among the large number of execution platforms available (e.g., hundreds or thousands of compute instances of a virtual computing service, or hundreds or thousands of non-virtualized hosts). Default communication channels may be established between pairs of components that need to interact, such as client and server components of the same service (element 904). In some cases the default channels may involve intermediaries such as load balancers. Any appropriate networking protocols may be used, including for example the TCP/IP family of protocols or other packet-switched protocols, for the default communication channels.

Some pairs of service components that happen to be placed at execution platforms that are in close proximity may have an ACC available, such as a communication bus that may be available at an instance host at which service components are implemented using compute instances or virtual machines. As noted above, the set of components that have access to an ACC (which may in some cases be a small subset of the set of components of the distributed service as a whole) may be termed a locality group. A given pair of components of a locality group, such as a client component C and a server component S of the same service, may be willing to share resource quotas (e.g., CPU time, I/O request allotments, or bandwidth use allotments) with each other. For example, if the client and server components have already reached a local workload agreement as described above, the client component may be willing to transfer a portion of its resource quota, for some time period in which it does not expect to be very busy, to the server component with which it is interacting via the ACC. Such cooperative component pairs (or larger groups of cooperating components of one or more services) may reach a resource sharing agreement, e.g., using some number of negotiation messages transmitted via the ACC (element 907). The resource sharing agreement may indicate, for example, the kinds of resources that one or more of the agreeing parties is willing to give up and the triggering conditions under which the resources are to be given up.

A resource manager responsible for handling resource allocation for the components involved in the agreement may determine that the resource sharing agreement has been reached (element 910). In some implementations, the resource manager may be notified by one of the parties to the agreement. In other implementations, the resource manager may itself be involved in the negotiation, or may be able to detect that the agreement has been reached by listening to traffic on the ACC. In at least one embodiment, a resource relinquishment agreement may be reached between a given service component and the resource manager, in which the component indicates that it is willing to give up some resources allocated to it under certain conditions, and the resource manager may be allowed to decide how the relinquished resources are to be used. Based on the resource sharing or relinquishment agreement, the resource manager may transfer resource capacity among the components for whose resource allocation it is responsible (element 913). For example, CPU quotas may be increased for the intended recipient component, and decreased for the relinquishing component, during periods in which the relinquishing component experiences a low service-related workload.

Figure 10:
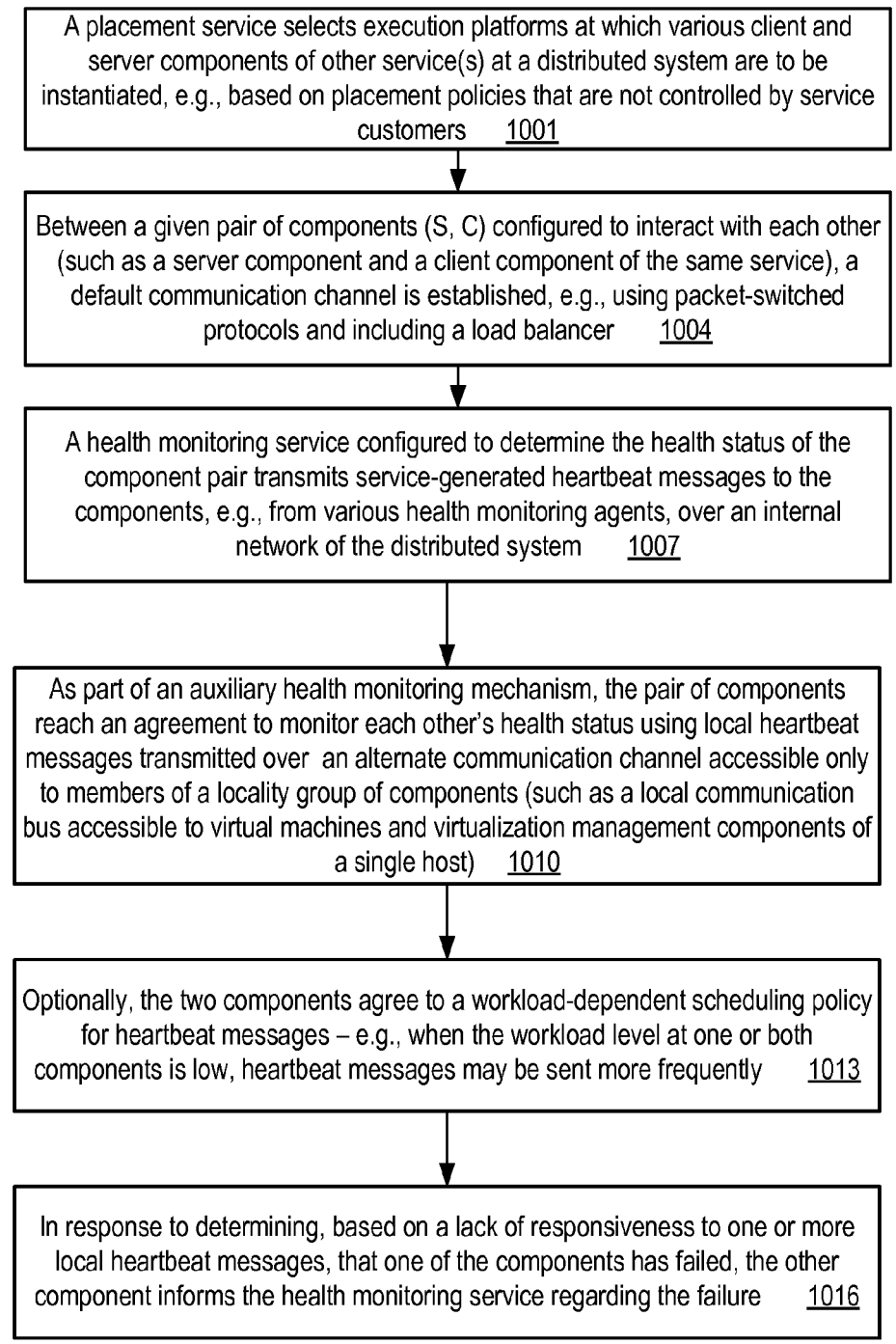
FIG. 10 is a flow diagram illustrating aspects of operations that may be performed to implement an auxiliary health monitoring mechanism among service components, according to at least some embodiments.

FIG. 10 is a flow diagram illustrating aspects of operations that may be performed to implement an auxiliary health monitoring mechanism among service components, according to at least some embodiments. As shown in element 1001, a placement service may select execution platforms for various components of a distributed system in accordance with placement policies over which the service consumers do not have direct control. As discussed previously, default communication channels may be set up between pairs of components that need to interact to perform their intended functionality (element 1004).

The distributed system may have one or more health monitoring services (HMSs) set up, responsible for tracking the status and responsiveness of various service components. Such an HMS may transmit heartbeat messages to the service components, e.g., from various HMS agents distributed around the internal network in use at the distributed system (element 1007). The responsiveness of the components to the service-generated heartbeat messages may be used as a metric for failure detection by the default health monitoring mechanism of the distributed system.

Some sets of service components may have been instantiated at execution platforms that happen to have, e.g., by virtue of their proximity to one another, ACCs available. A given pair of components (S, C) in such a locality group of components may decide to implement an auxiliary health monitoring mechanism using the ACC, in accordance with which the components send local heartbeat messages to each other via the ACC (in addition to continuing to respond to the default service-generated heartbeat messages) (element 1010). Thus, the client component may issue local heartbeat messages via the ACC to the server component, and the server component may issue local heartbeat messages via the ACC to the client component. In some embodiments, one or more parameters of the local heartbeat mechanism may be dynamically changed based on current conditions at either or both parties—e.g., a workload-dependent local heartbeat scheduling policy may be used (element 1013), in accordance with which the interval between successive heartbeat messages is lengthened when the non-heartbeat-related workload is high, and shortened when the non-heartbeat-related workload is low. In response to a determination by one of the participating components, based on a lack of responsiveness to one or more local heartbeat messages by the other component, that the other component is in an unhealthy or failed state, a notification may be sent to the HMS (element 1016), e.g., so that recovery or remedial operations can commence more quickly than might have been possible if only the default health monitoring mechanism were being used.

It is noted that in various embodiments, operations other than those illustrated in the flow diagram of FIGS. 8, 9 and 10 may be used to implement the techniques of utilizing alternate communication channels described above. Some of the operations shown may not be implemented in some embodiments or may be implemented in a different order, or in parallel rather than sequentially. For example, in some embodiments, the discovery process for determining whether potential for cooperation between pairs of components exists within a given locality group may be begun prior to, or in parallel with, the process of configuring default communication channels. In some implementations, for example, the discovery process may be instantiated as part of the bring-up or boot operations of a service component. It is also noted that the techniques of resource sharing and auxiliary health monitoring may be implemented by entities that need not be part of the same service (or any service at all)—e.g., local heartbeat messages may be exchanged on a communication bus of a host by executing programs that have no service-related affiliation with each other.

Use Cases

The techniques described above, of discovering and utilizing fast, local communication channels that bypass the traditional network-based client-to-server communication paths in large distributed systems may be useful in a number of scenarios. As the demand for provider-implemented virtualized services grows, larger and larger fleets of compute instances and instance hosts may be set up. Individual hardware servers also become more powerful over time, so the number of compute instances that may be launched on a given server (or at a given server rack) may increase. Thus, the likelihood that a client and a server component of the same service happen to be placed on the same instance host may well increase over time.

The use of local inter-instance communication busses of the kind described above, or the rack-based local sub-networks, may in some cases reduce the latency associated with client-server interactions by at least a few milliseconds. In addition, the processing overhead associated with the default communication pathways (which may involve networking stack code paths that may not be exercised if the alternate channels are employed) may also be lowered. Workload levels at load balancers may also be lowered if ACCs are used to offload a significant fraction of the traffic. Complex services and applications (e.g., applications used for making packaging and fulfillment decisions for large e-retail firms) that sometimes implement tens or hundreds of interactions between client and server components for a single end-customer request may benefit greatly from the use of the ACCs.

The implementation of the resource sharing techniques described may help to increase the overall hardware utilization levels of the resources deployed in distributed systems, which would help increase the return on investment of the provider operators. The use of the auxiliary health monitoring mechanism may help failure detection and recovery in at least two ways: first, certain types of failures (such as unexpected process terminations) may be detected more quickly than may have been possible without the auxiliary mechanisms, and second, uncertainty regarding the root cause of unresponsiveness may be reduced.

Illustrative Computer System

Figure 11:
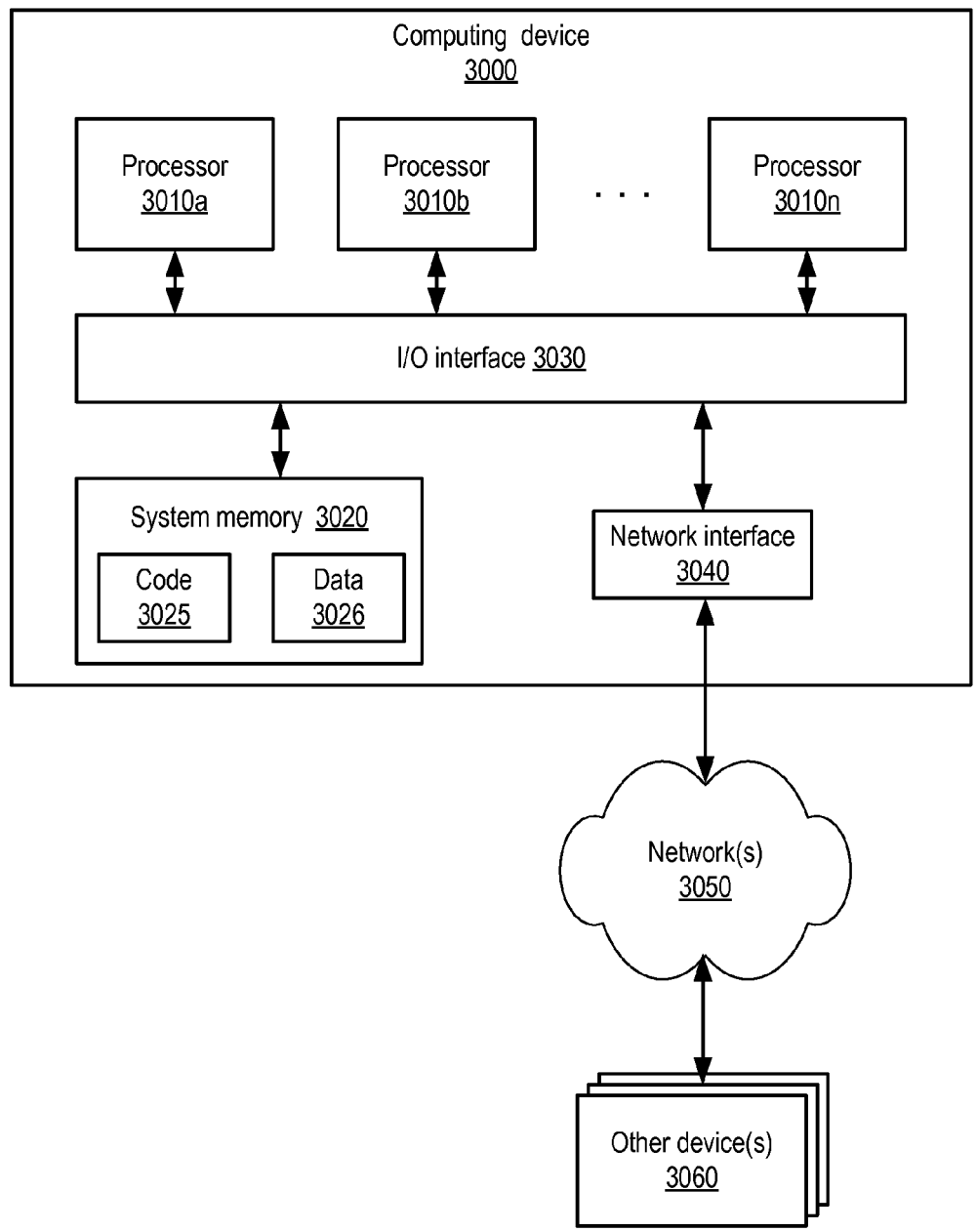
FIG. 11 is a block diagram illustrating an example computing device that may be used in at least some embodiments.

In at least some embodiments, a server that implements a portion or all of one or more of the technologies described herein, including the techniques to implement the client and server components, the placement service, the health monitoring service, load balancers, and/or resource managers may include a general-purpose computer system that includes or is configured to access one or more computer-accessible media. FIG. 11 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 10, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
instantiate a first component of a distributed system at a first execution platform selected by a placement manager;
establish a default communication channel for messages between the first component and other components of the distributed system including a second component instantiated at a second execution platform, wherein the default communication channel includes a load balancer and employs a packet-switching networking protocol;
after the default communication channel is established, initiate, by the second component, transmission of one or more messages to the first component to negotiate a local workload agreement between the first and second components using an alternate communication channel accessible within a locality group comprising a plurality of execution platforms;
receive, by the second component, an indication of agreement from the first component in response to at least one of the one or more messages transmitted to the first component to establish the local workload agreement between the first and second components, wherein the local workload agreement is indicative of a request workload to be submitted by the second component to the first component via the alternate communication channel;
subsequent to receipt by the second component of the indication of agreement, submit a work request via the alternate communication channel to the first component by the second component; and
receive, at the second component via the alternate communication channel, a response to the work request submitted to the first component by the second component via the alternate communication channel.

2. The system as recited in claim 1, wherein the first component is implemented at a first guest virtual machine at a particular instance host of a provider network, wherein the second component is implemented at a second guest virtual machine at the particular instance host, and wherein the alternate communication channel comprises a communication bus implemented by a virtualization management software stack component of the particular instance host.

3. The system as recited in claim 1, wherein the first component is implemented at a first host mounted at a particular rack of a data center, wherein the second component is implemented at a second host mounted at the particular rack.

4. The system as recited in claim 1, wherein the one or more computing devices are further configured to:
establish, using the alternate communication channel, a resource sharing agreement associated with the first and second components, in accordance with which a unit of resource capacity allocated for the second component is to be transferred to the first component in response to a triggering condition.

5. The system as recited in claim 1, wherein the one or more computing devices are further configured to:
configure the first and second components to respond to service-generated heartbeat messages transmitted from a health monitoring service;
transmit, from the first component to the second component via the alternate communication channel, a series of local heartbeat messages, wherein the local heartbeat messages are scheduled in accordance with a heartbeat agreement reached between the first and second component;
determine, at the first component, based on a responsiveness of the second component to one or more local heartbeat messages, a health status of the second component; and
transmit, to the health monitoring service from the first component, an indication of the health status of the second component.

6. The system as recited in claim 1, wherein the one or more computing devices are further configured to:
prior to an establishment of the local workload agreement, transmit, from the first component, over the alternate communication channel, a component advertisement comprising an indication of one or more request types to which the first component is capable of responding via the alternate communication channel; and detect, by the second component, the component advertisement.

7. The system as recited in claim 1, wherein the one or more computing devices are further configured to:

prior to an establishment of the local workload agreement, transmit, from the second component, over the alternate communication channel, a request advertisement indicating one or more service requirements of the second component; and detect, by the first component, the request advertisement.

8. A method, comprising:

performing, by one or more computing devices:

configuring a default communication channel for messages between a first component of a distributed system and other components of the distributed system, wherein the default communication channel employs a packet-switching networking protocol;

after configuration of the default communication channel, initiating, by a second component of the distributed system, transmission of one or more messages to the first component to negotiate a local workload agreement between the first and second components using an alternate communication channel accessible from a subset of components of the distributed system;

receiving, by the second component, an indication of agreement via the alternate communication channel in response to at least one of the one or more messages transmitted to the first component to establish the local workload agreement between the first component and the second component of the distributed system, wherein the local workload agreement is indicative of a request workload to be submitted by the second component to the first component via the alternate communication channel;

subsequent to receipt by the second component of the indication of agreement, submit a work request via the alternate communication channel to the first component by the second component; and receiving, at the second component via the alternate communication channel, a response to the work request submitted via the alternate communication channel to the first component from the second component in accordance with the local agreement.

9. The method as recited in claim 8, wherein the first component is implemented at a first guest virtual machine instantiated at a particular instance host of a provider network, wherein the second component is implemented at a second guest virtual machine instantiated at the particular instance host, and wherein the alternate communication channel comprises a communication bus implemented by a virtualization management software stack component of the particular instance host.

10. The method as recited in claim 8, wherein the first component is implemented at a first host mounted at a particular rack of a data center, wherein the second component is implemented at a second host mounted at the particular rack.

11. The method as recited in claim 10, wherein the alternate communication channel comprises one of: (a) a SCSI (Small Computer System Interface) cable, (b) a HIPPI (High Performance Parallel Interface) bus, or (c) a fibre channel link.

12. The method as recited in claim 8, further comprising performing, by the one or more computing devices:

establishing, using the alternate communication channel, a resource sharing agreement associated with the first and second components, in accordance with which a unit of resource capacity allocated for a particular component of the first and second components is to be transferred to another component of the first and second components in response to a triggering condition.

13. The method as recited in claim 12, wherein the unit of resource capacity comprises one of: a block of CPU (central processing unit) time, one or more I/O (input/output) operations, a block of memory, or a unit of network bandwidth use.

14. The method as recited in claim 12, wherein the triggering condition comprises a determination that a workload of the particular component is expected to be below a threshold level during a particular time interval.

15. The method as recited in claim 8, further comprising performing, by the one or more computing devices:

configuring the first and second components to respond to service-generated heartbeat messages transmitted from a health monitoring service of the distributed system;

transmitting, from the first component to the second component via the alternate communication channel, a series of local heartbeat messages, wherein the local heartbeat messages are scheduled in accordance with a heartbeat agreement reached between the first and second component;

determining, at the first component, based on a responsiveness of the second component to one or more local heartbeat messages, a health status of the second component; and transmitting, to the health monitoring service from the first component, an indication of the health status.

16. The method as recited in claim 15, wherein, in accordance with the heartbeat agreement, an interval between transmission of a particular heartbeat message and transmission of a next heartbeat message is determined based at least in part on one or more of: (a) a workload level of the first component, or (b) a workload level of the second component.

17. The method as recited in claim 15, further comprising performing, by the one or more computing devices:

providing, to the health monitoring service from the second component, an indication that the first component is a trusted source of health status of the second component.

18. The method as recited in claim 8, wherein the default communication channel comprises a load balancer, further comprising performing, by the one or more computing devices:

providing an indication of the local agreement to the load balancer.

19. A non-transitory computer-accessible storage medium storing program instructions that when executed on one or more processors implements a first component of a network-accessible service, wherein the first component is configured to:

utilize a default communication channel of the service to participate in application-layer client-server interactions with one or more other components of the service;

after the default communication channel has been utilized, identify a second component of the service that has access to an alternate communication channel available to a subset of components of the service including the first component;

receive one or more messages from the second component to negotiate a local workload agreement between the first and second components using the alternate communication channel; and send, to the second component, an indication of agreement from the first component in response to at least one of the one or more messages received by the first component to establish the local workload agreement with the second component, wherein, in accordance with the local workload agreement, the alternate communication channel is to be used to respond to one or more service requests received from the second component at the first component via the alternate communication channel.

20. The non-transitory computer-accessible storage medium as recited in claim 19, wherein the first component is further configured to:

transmit, prior to an establishment of the local workload agreement, a message over the alternate communication channel indicating one or more categories of service requests that can be fulfilled by the first component.

21. The non-transitory computer-accessible storage medium as recited in claim 20, wherein the message includes one or more of: (a) an indication of a performance advantage achievable using the alternate communication channel for a particular operation, relative to a performance achievable using the default communication channel, (b) an indication of a pricing policy to be used for requests submitted via the alternate communication channel, (c) an indication of a maximum workload capacity of the first component for requests submitted via the alternate communication channel, or (d) security metadata identifying the first component.

22. The non-transitory computer-accessible storage medium as recited in claim 19, wherein the first component is further configured to:

transmit, prior to an establishment of the local workload agreement, a message over the alternate communication channel indicating one or more service requirements of the first component.

23. The non-transitory computer-accessible storage medium as recited in claim 19, wherein the first component is implemented at a first guest virtual machine instantiated at a particular instance host of a provider network, wherein the second component is implemented at a second guest virtual machine instantiated at the particular instance host, and wherein the alternate communication channel comprises a communication bus implemented by a virtualization management software stack component of the particular instance host.

24. The non-transitory computer-accessible storage medium as recited in claim 19, wherein the first component is further configured to:

establish, using the alternate communication channel, a resource sharing agreement involving the second component, in accordance with which a unit of resource capacity allocated to the second component is to be transferred to the first component in response to a triggering condition.

25. The non-transitory computer-accessible storage medium as recited in claim 19, wherein the first component is further configured to:

transmit, to the second component via the alternate communication channel, a series of local heartbeat messages, wherein the local heartbeat messages are scheduled in accordance with a heartbeat agreement reached between the first and second component;

determine, based on a responsiveness of the second component to one or more local heartbeat messages, a health status of the second component; and transmitting, to a health monitoring service of the distributed system, an indication of the health status.

\* \* \* \* \*